US010599578B2

United States Patent
Farmahini Farahani et al.

(10) Patent No.: US 10,599,578 B2
(45) Date of Patent: Mar. 24, 2020

(54) DYNAMIC CACHE BYPASSING

(71) Applicant: Advanced Micro Devices, Inc., Sunnyvale, CA (US)

(72) Inventors: Amin Farmahini Farahani, Sunnyvale, CA (US); David A. Roberts, Boxborough, MA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 15/377,537

(22) Filed: Dec. 13, 2016

(65) Prior Publication Data

US 2018/0165214 A1   Jun. 14, 2018

(51) Int. Cl.
  *G06F 12/08*    (2016.01)
  *G06F 13/00*    (2006.01)
  *G06F 12/0888*  (2016.01)
  *G06F 12/0806*  (2016.01)

(52) U.S. Cl.
  CPC ...... *G06F 12/0888* (2013.01); *G06F 12/0806* (2013.01); *G06F 2212/6046* (2013.01)

(58) Field of Classification Search
  CPC ............ G06F 12/00; G06F 12/08; G06F 13/00
  USPC ......................................... 711/100, 138, 154
  See application file for complete search history.

(56) References Cited

U.S. PATENT DOCUMENTS

| | | | | |
|---|---|---|---|---|
| 5,517,626 A | * | 5/1996 | Archer | G06F 13/28 710/105 |
| 5,909,697 A | * | 6/1999 | Hayes | G06F 12/0831 711/122 |
| 6,119,205 A | * | 9/2000 | Wicki | G06F 12/0804 711/122 |
| 8,924,645 B2 | | 12/2014 | Chang | |
| 2008/0059707 A1 | * | 3/2008 | Makineni | G06F 12/0897 711/122 |
| 2008/0104329 A1 | * | 5/2008 | Gaither | G06F 12/0888 711/138 |
| 2009/0172287 A1 | * | 7/2009 | LeMire | G06F 12/0893 711/128 |
| 2010/0131717 A1 | * | 5/2010 | Dumarot | G06F 11/1666 711/138 |
| 2014/0156931 A1 | * | 6/2014 | Krick | G06F 12/0811 711/122 |
| 2015/0331804 A1 | * | 11/2015 | Vajapeyam | G06F 12/0811 711/122 |

* cited by examiner

*Primary Examiner* — Tuan V Thai

(57) ABSTRACT

A processing system fills a memory access request for data from a processor core by bypassing a cache when a write congestion condition is detected, and when transferring the data to the cache would cause eviction of a dirty cache line. The cache is bypassed by transferring the requested data to the processor core or to a different cache. Accordingly, the processing system can temporarily bypass the cache storing the dirty cache line when filling a memory access request, thereby avoiding the eviction and write back to main memory of a dirty cache line when a write congestion condition exists.

19 Claims, 8 Drawing Sheets

DYNAMIC CACHE BYPASSING

GOVERNMENT LICENSE RIGHTS

This invention was made with government support under Prime Contract Number DE-AC52-07NA27344, Subcontract No. B608045 awarded by the Department of Energy (DOE). The Government has certain rights in this invention.

BACKGROUND

Description of the Related Art

To support execution of instructions, a processing system typically includes a memory subsystem having memory modules to store data to be accessed by the executing instructions. The memory subsystem can be organized into a memory hierarchy having main memory at the top of the hierarchy to store a larger quantity of data that can be accessed by the executing instructions, and one or more caches at lower levels of the memory hierarchy to store subsets of the data stored at main memory. For example, a processing system includes a memory hierarchy having two caches, a higher level cache (closer to main memory in the memory hierarchy) and a lower level cache (closer to a processor core of the processing system), wherein the lower level cache stores a subset of the higher level cache. Because a cache is typically of limited size relative to main memory, the cache controller implements a replacement policy wherein, in response to receiving a new cache line, the controller identifies if there is room available in the cache to store the new cache line and, if not, selects a cache line already stored in the cache for eviction. If the cache line selected for eviction has been modified by the processor (referred to as a "dirty" cache line), the cache controller writes the cache line back to main memory or to one or more higher level caches. Evictions therefore consume memory bandwidth, which can negatively impact processing efficiency in certain scenarios.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-8 illustrate techniques for filling a memory access request for data from a processor core by bypassing a cache when a write congestion condition is detected, and when transferring the data to the cache would cause eviction of a dirty cache line. The cache is bypassed by transferring the requested data to the processor core or to a different cache. To illustrate, upon receiving a memory access request, a memory controller determines whether a dirty cache line will have to be evicted from the cache to make room for the requested data. In addition, a write congestion monitor determines whether a write congestion condition exists resulting from relatively low write bandwidth at main memory (because, for example, the main memory employs some relatively slower memory modules, referred to herein as "slow memory", such as non-volatile memory modules). If a requested cache line is not predicted to be subsequently requested within a threshold amount of time, it may not be advantageous to store the cache line in a cache. Accordingly, using the techniques described herein, the cache controller can temporarily bypass the cache storing the dirty cache line when filling a memory access request, thereby avoiding the eviction and write back to main memory of a dirty cache line when a write congestion condition exists.

To bypass the cache storing the dirty cache line, the cache controller transfers the cache line that is the subject of the memory access request from the main memory to the processor core or, in some embodiments, from the main memory to a cache at a lower level in the memory hierarchy than the cache storing the dirty cache line, without storing the cache line that is the subject of the memory access request in the cache storing the dirty cache line. The techniques described herein thereby provide for increased processing efficiency by avoiding or delaying the eviction of dirty cache lines from the cache and consequent writing back to main memory, without modifying the existing cache replacement policy or increasing the size or power consumption of the memory controller and corresponding processing system.

Figure 1:
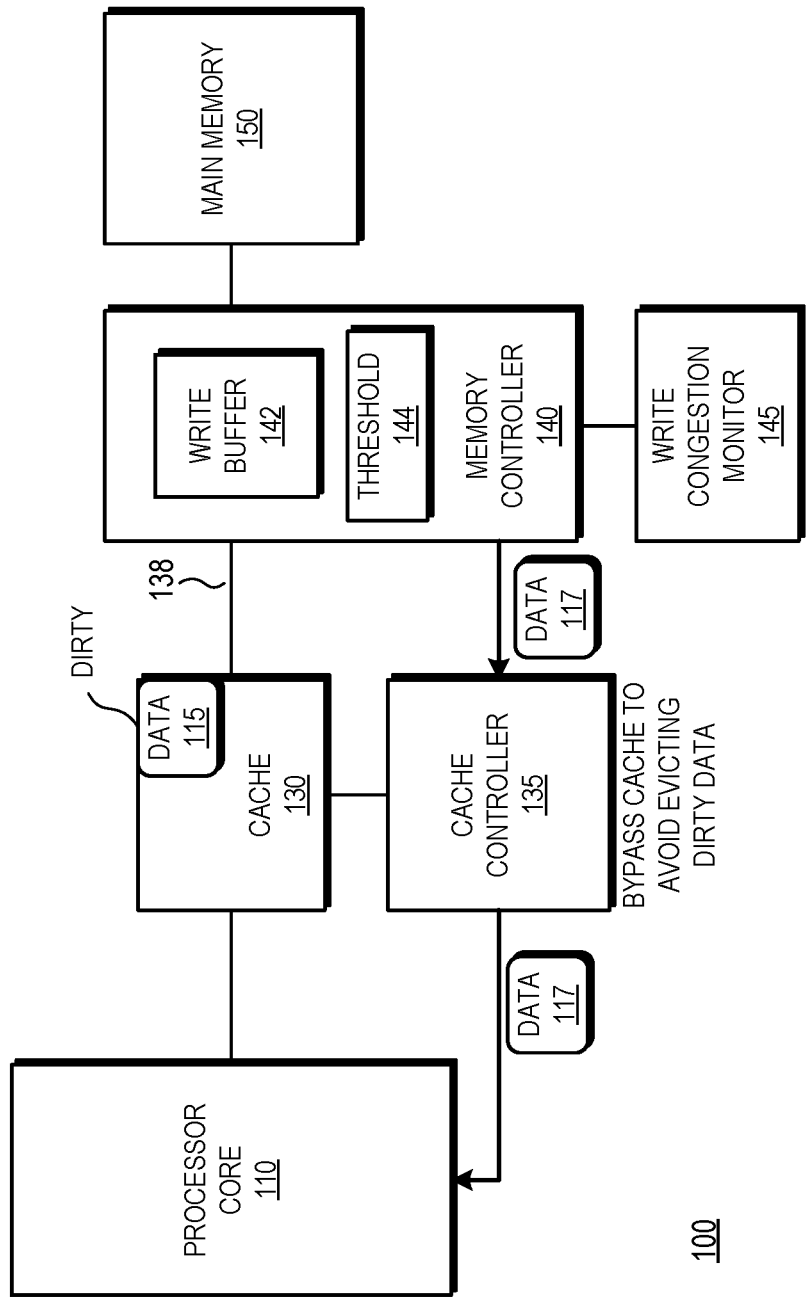
FIG. 1 is a block diagram of a processing system filling a memory access request by bypassing a cache storing a dirty cache line when a write congestion condition is detected and transferring the requested data to the processor without installing the data in the cache in accordance with some embodiments.

FIG. 1 illustrates a processing system 100 that fills a memory access request for data from a processor by bypassing a cache from which a dirty cache line would have been evicted to make room for the incoming data when a write congestion condition is detected and transfers the requested data directly to the processor in accordance with some embodiments. The processing system 100 is generally configured to execute sets of operations organized in the form of computer programs in order to carry out tasks on behalf of an electronic device. Accordingly, the processing system 100 may be used in any of a variety of electronic devices, such as a desktop or laptop computer, server, smartphone, tablet, game console, and the like.

To facilitate execution of instructions, the processing system 100 includes a processor 110, a cache 130, a cache controller 135, a write bus 138, a write congestion monitor 145, a main memory 150, and a memory controller 140 including a write buffer 142 having a threshold 144. The processor 110 includes one or more instruction pipelines to execute instructions, organized in the form of computer programs, thereby carrying out tasks on behalf of an electronic device. While the processor 110 may have some amount of integral memory, for example, in the form of registers, such memory is typically limited in storage capacity. Accordingly, in order to execute instructions, the processor 110 stores and retrieves data from the memory hierarchy of the processing system 100. As noted above, the memory hierarchy includes one or more caches 130 that compose the lower levels of the memory hierarchy, and main memory 150 that resides at the top of the memory hierarchy and typically stores all or a relatively large portion of data that is expected to be accessed by programs executing at the processor 110.

The processing system 100 may employ a non-uniform memory access (NUMA) architecture, whereby the one or more caches and main memory could be composed of memory modules having different memory architectures. Thus, in the depicted example, the cache 130 could be composed of fast memory, such as dynamic random access memory (DRAM), and main memory 150 could be composed of slow memory, such as non-volatile memory. The NUMA architecture supports more flexible and robust data storage at main memory while maintaining processing efficiency. It will be appreciated that the techniques described herein can be applied to other processing systems having different memory architectures.

To access the memory hierarchy of the processing system 100, the processor 110 generates operations, referred to as memory access requests, to store data (a write operation) to or load data (a read operation) from the memory hierarchy, and provides the memory access requests to the cache controller 135 for processing. As described further herein, the cache controller 135 works together with the one or more modules of cache 130, the memory controller 140, and main memory 150 to satisfy the memory access requests. Although for purposes of illustration one cache module and one module of main memory are depicted in FIG. 1, it will be appreciated that the processing system 100 may include more modules of cache and main memory and may use any memory technology.

The cache 130 is a memory module that stores data for access by the processor core 110. In at least one embodiment, the cache 130 is composed of a set of entries, each of which can store an associated cache line. In some embodiments, the cache 130 is a set associative cache, wherein the cache 130 is divided into a number of sets. Each set includes a number of ways, with each way corresponding to a cache entry that can store a cache line. Each set only stores a cache line associated with subset of memory addresses, wherein the subset associated with a set is identified by the cache controller 135 based on a portion of the memory address referred to as the index. By employing set associativity, the cache 130 facilitates relatively quick identification of cache misses and cache hits.

The cache controller 135 is configured to receive memory access requests for data from the processor 110 and read and write data to memory. In the case of a read operation, the cache controller 135 provides the requested cache line from the cache 130 to the processor 110. In the case of a write operation, the cache controller 135 stores the write data to the cache entry of the cache 130. If the requested cache line is not found in the cache 130, a cache miss has occurred. In the event of a cache miss, the memory controller 140 satisfies the memory access request at main memory 150. In particular, in the case of a read operation, the memory controller 140 copies the requested cache line from the main memory 150, and typically sends it to one or more cache controllers 135 (only one of which is depicted in FIG. 1), which install the requested cache line in their respective caches 130 (only one of which is depicted in FIG. 1) of the memory hierarchy, and provide the cache line (or a portion thereof) to the processor 110, thereby satisfying the read operation. In the case of a write operation, the memory controller 140 provides the corresponding write data and write address to the main memory 150 to write the data to the entry corresponding to the write address.

In some embodiments, the cache 130 is sized such that it typically is unable to store, at a given point in time, all the data that is requested, or may be requested, by the processor core 110, thereby requiring data to be transferred through the memory hierarchy as described above. To ensure data coherency and efficient transfer of data through the memory hierarchy, the cache controller 135 implements a replacement policy to identify if there is an entry in a set available to store a received cache line and, if not, to select one of the entries in the set for replacement. The availability of a cache entry is indicated by status information associated with the entry, referred to as the valid status of the entry. In particular, a cache line having an invalid validity status (referred to herein as an invalid cache line) is one that is available to store data and a cache line having a valid validity status (referred to herein as a valid cache line) is one that is not available to store data unless it is replaced. To replace a valid cache line at an entry with an incoming cache line, the cache controller 135 for the cache 130 first evicts the valid cache line by transferring it to one or more other levels of the memory hierarchy (not shown), and then stores the incoming cache line at the entry. To maintain memory coherency, in the event the cache line that is selected pursuant to the replacement policy is in a modified state (i.e., is "dirty"), the cache line is written back to main memory upon eviction from the cache 130. When data is written to main memory, it is provided to the bus 138, from which it is conveyed to the write buffer 142. The cache controller 135 is configured to detect the presence of a dirty cache line in a set of the cache 130.

The main memory 150 can process a write request at a particular rate depending on available resources such as buffer space, bus availability and the like, wherein the rate is referred to herein as the write bandwidth for the memory. In some embodiments, the main memory 150 has a relatively slow write bandwidth. In some situations, such as when several program threads are actively executing at the processor 110, the memory controller 140 can receive write requests at a rate that exceeds the write bandwidth for the main memory 150. Further, the main memory 150 can process a read request at a rate, referred to herein as the read bandwidth for the memory. In some embodiments, the read bandwidth of the main memory 150 is relatively faster than the write bandwidth of the main memory 150.

The write buffer 142 stores write requests awaiting processing at the main memory 150. By grouping together write requests at the write buffer 142, the memory controller 140 prevents the pending write requests from blocking pending read requests. In at least one embodiment, the write buffer 142 is implemented as a queue configured to store pending write requests in order as they are received from the processor 110. In at least one embodiment, the write buffer 142 is implemented in any form of memory that has faster write bandwidth than main memory 150, and main memory 150 is implemented in any form of memory, including volatile memory, that has slower write bandwidth than the write buffer 142. The memory controller 140 selects the next write request for the main memory 150 from the write buffer 142, and writes it to the main memory 150.

The write buffer 142 is associated with a threshold 144. The threshold 144 is a programmable value stored at a register or other storage module that indicates the occupancy of write buffer 142. In at least one embodiment, the threshold 144 is implemented as a number of pending write requests stored in the write buffer 142. Alternatively, in other embodiments the threshold 144 is implemented as a ratio of write buffer entries filled with valid pending write requests to write buffer entries not filled with valid pending write requests such as, for example, vacant write buffer entries or write buffer entries filled with invalid pending write requests.

To facilitate processing efficiency, the processing system 100 employs a write congestion monitor 145 to detect write congestion conditions in the main memory 150 and notify the cache controller 135 when such a condition exists. In some situations, such as during periods of heavy write access to the main memory 150, the bus 138 is occupied and/or the write buffer 142 is filled to capacity or near the full capacity. In other situations, a memory bank (not shown) in main memory 150 to which the dirty cache line would be allocated may be servicing requests from the processor or other units in the processing system 100. The write congestion monitor 145 detects write congestion conditions and asserts a signal with congestion information, such as the memory bank number that is servicing other requests, to the cache controller 135 when a write congestion condition is detected.

Further, the cache controller 135 can detect or be informed of conditions in which writes to main memory 150 can be avoided. Therefore, cache controller 135 may not request writes to main memory 150 in those conditions. In some situations, a pending memory access request may be for a cache line that is not predicted to be subsequently requested within a threshold period of time. In these situations, the cache controller 135 may not install the cache line in the cache 130, which obviates the need to potentially evict a dirty cache line to main memory 150.

In the event that a cache miss occurs for data 117 such that the memory controller 140 fills the request at the main memory 150 and the cache controller 135 determines that the incoming requested data 117 would result in the eviction of a dirty cache line 115 from the cache 130, and in the further event that the write congestion monitor 145 asserts a signal to the cache controller 135 that a write congestion condition has been detected, the cache controller 135 bypasses the cache 130 in filling the memory access request for data 117, and provides the data 117 directly to the processor 110. In this manner, eviction of the dirty cache line 115 from the cache 130 is avoided or delayed. By avoiding or delaying eviction of the dirty cache line 115 from the cache 130, the processing system 100 avoids writing the dirty cache line 115 to main memory 150 during a period of write congestion.

To illustrate, in operation, upon receiving a memory access request for data 117 from the processor 110 that results in a cache miss at the cache 130, the memory controller 140 satisfies the memory access request at the main memory 150. The cache controller 135 determines whether storing the data 117 at the cache 130 will result in the eviction of a dirty cache line 115 from the cache 130. In some embodiments, eviction of the dirty cache line 115 may occur if the requested data 117 will be stored in the same set of the cache 130 that stores the dirty cache line 115. If the cache controller 135 determines that storing the data 117 at the cache 130 will or is likely to result in the eviction of the dirty cache line 115 from the cache 130, the cache controller 135 queries the write congestion monitor 145 to determine whether a write congestion condition exists.

The write congestion monitor 145 determines whether a write condition exists, such as the bus 138 being occupied, the write buffer 142 reaching a threshold 144 capacity, or a memory bank at the main memory 150 for the dirty cache line 115 servicing requests. If the write congestion monitor 145 detects a write congestion condition, the write congestion monitor 145 asserts a signal to the cache controller 135 notifying the cache controller 135 of the write congestion condition. If the cache controller 135 determines that storing the data 117 at the cache 130 will result in the eviction of the dirty cache line 115 from the cache 130 and receives a signal from the write congestion monitor 145 that a write congestion condition exists, the cache controller 135 fills the memory access request by receiving the requested data 117 from the memory controller 140 and transferring it directly to the processor core 110. In this manner, the processing system 100 bypasses the cache 130 when filling the memory access request and avoids or delays evicting the dirty cache line 115 from the cache 130. Similarly, if the cache controller 135 detects or is informed that the requested data 117 is not predicted to be subsequently requested within a threshold period of time, the processing system 100 bypasses the cache 130.

Figure 2:
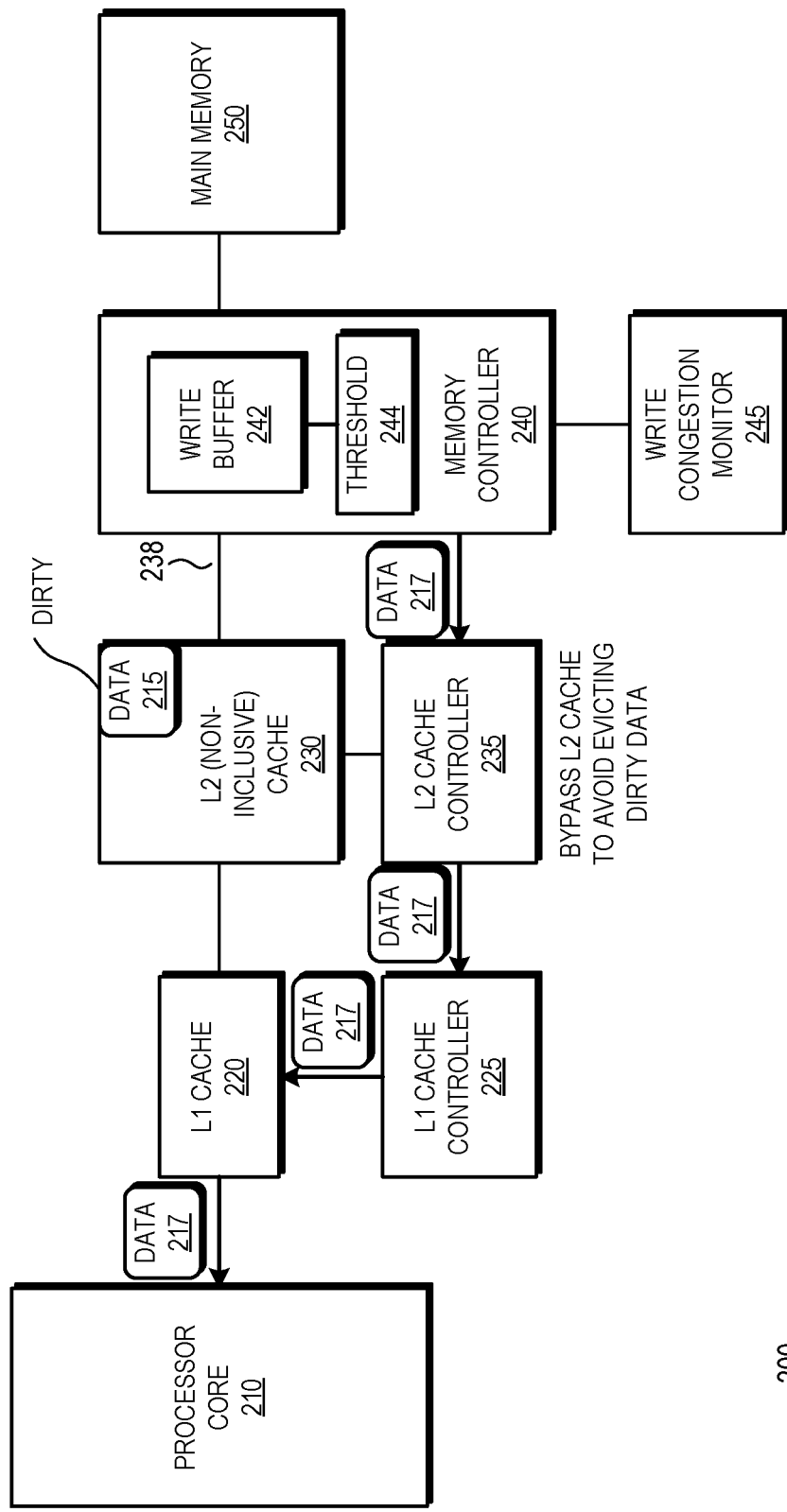
FIG. 2 is a block diagram of a processing system filling a memory access request for a read operation from a processor by bypassing a higher level non-inclusive cache storing a dirty cache line when a write congestion condition is detected and transferring the requested data to a lower level cache in accordance with some embodiments.

FIG. 2 illustrates an example of a processing system 200 having two non-inclusive levels of cache memory filling a memory access request for a read operation from a processor by bypassing a non-inclusive higher level cache storing a dirty cache line when a write congestion condition is detected in accordance with some embodiments. The processing system 200 includes a processor core 210, a lower level L1 cache 220, an L1 cache controller 225, a higher level L2 cache 230, an L2 cache controller 235, a bus 238, a memory controller 240 including a write buffer 242 having a threshold 244, a write congestion monitor 245, and a main memory 250.

The processor core 210, L2 cache controller 235, write congestion monitor 245, bus 238, write buffer 242, threshold 244, main memory 250, and memory controller 240 of FIG. 2 are configured to operate similarly to the corresponding components illustrated in and described with respect to FIG. 1. In contrast to the processing system 100 of FIG. 1, the processing system 200 of FIG. 2 includes two non-inclusive levels of cache memory: L1 cache 220 and L2 cache 230.

The L1 cache 220 and the L2 cache 230 are memory modules that store data for access by the processor core 210. In at least one embodiment, the L1 cache 220 and L2 cache 230 are each composed of a set of entries, each of which can store an associated unit of data referred to as a cache line. In some embodiments, the L1 cache 220 and L2 cache 230 are set associative caches, wherein the caches are each divided into a number of sets. Each set includes a number of ways, with each way corresponding to a cache entry that can store a cache line. Each set only stores a cache line associated with subset of memory addresses, wherein the subset associated with a set is identified by the memory controller 232 based on a portion of the memory address referred to as the index. By employing set associativity, the L1 cache 220 and L2 cache 230 facilitate relatively quick identification of cache misses and cache hits. In some embodiments, the L1 cache 220 stores a subset of the data stored at the L2 cache 230. However, the L2 cache 230 is non-inclusive of the L1 cache. Therefore, the L2 cache 230 does not necessarily store copies of each of the cache lines stored at the L1 cache 220.

The L1 cache 220, L1 cache controller 225, L2 cache 230, L2 cache controller 235, main memory 250 and memory controller 240 work together to satisfy the memory access requests, as described further herein. In operation, the processor core 210 issues a memory access request to the L1 cache controller 225. In the case of a read operation, the L1 cache controller 225 provides the requested cache line from the L1 cache 220 to the processor core 210. In the case of a write operation, the L1 cache controller 225 stores the write data to the cache entry of the L1 cache 220. If the requested cache line is not found in the L1 cache 220, a cache miss has occurred. In the event of a cache miss at the L1 cache 220, the L2 cache controller 235 satisfies the memory access request at the L2 cache 230. In the event of a cache miss at the L2 cache 230, the memory controller 240 satisfies the memory access request at the main memory 250. Conventionally, in the case of a read operation that misses in the L2 cache 230, the L2 cache controller 235 receives the requested cache line from the memory controller 240, stores it in the L2 cache 230, sends it to the L1 cache controller 225, which stores it in the L1 cache 220, and provides the cache line (or a portion thereof) to the processor core 210, thereby satisfying the read operation. However, if the L2 cache controller 235 detects that filling a memory access request will or is likely to result in the eviction of a dirty cache line 215 from the L2 cache 230 and is notified by the write congestion monitor 245 that a write congestion condition has been detected, the L2 cache controller 235 receives the requested cache line 217 from the memory controller 240 and bypasses the L2 cache 230, transferring the cache line 217 to the L1 cache controller 225, which stores the cache line 217 in the L1 cache 220, and provides the cache line 217 to the processor core 210.

To illustrate, in operation, upon receiving a memory access request for data 217 from the processor core 210 that results in a cache miss at the L2 cache 230, the memory controller 240 satisfies the memory access request at the main memory 250. The L2 cache controller 235 determines whether storing the data 217 at the L2 cache 230 will result in the eviction of a dirty cache line 215 from the L2 cache 230. In some embodiments, eviction of the dirty cache line 215 may occur if the data 217 will be stored in the same set of the cache 230 that stores the dirty cache line 215. If the cache controller 235 determines that storing the data 217 at the L2 cache 230 will or is likely to result in the eviction of the dirty cache line 215 from the L2 cache 230, the L2 cache controller 235 queries the write congestion monitor 245 to determine whether a write congestion condition exists.

The write congestion monitor 245 determines whether a write condition exists, such as the bus 238 being occupied, the write buffer 242 reaching a threshold 244 occupancy, or a memory bank (not shown) in main memory 250 for the dirty cache line 215 servicing requests. In some embodiments, the L2 cache controller 235 may determine or receive notification that the requested data 217 is not predicted to be subsequently requested within a threshold period of time. If the write congestion monitor 245 detects a write congestion condition, the write congestion monitor 245 asserts a signal notifying the L2 cache controller 235 of the write congestion condition. If the L2 cache controller 235 determines that storing the data 217 at the L2 cache 230 will result in the eviction of the dirty cache line 215 from the cache 230 and receives a signal from the write congestion monitor 245 that a write congestion condition exists, the L2 cache controller 235 fills the memory access request by receiving the requested data 217 from the memory controller 240 and transferring it to the L1 cache controller 225, which installs it in the L1 cache 220, from which it is copied to the processor core 210. In this manner, the processing system 200 bypasses the L2 cache 230 when filling the memory access request and avoids or delays evicting the dirty cache line 215 from the L2 cache 230. By avoiding or delaying evicting the dirty cache line 215 from the L2 cache 230, the processing system 200 avoids or delays writing the dirty cache line 215 to main memory 250 when a write congestion condition exists, thus improving processing efficiency.

Figure 3:
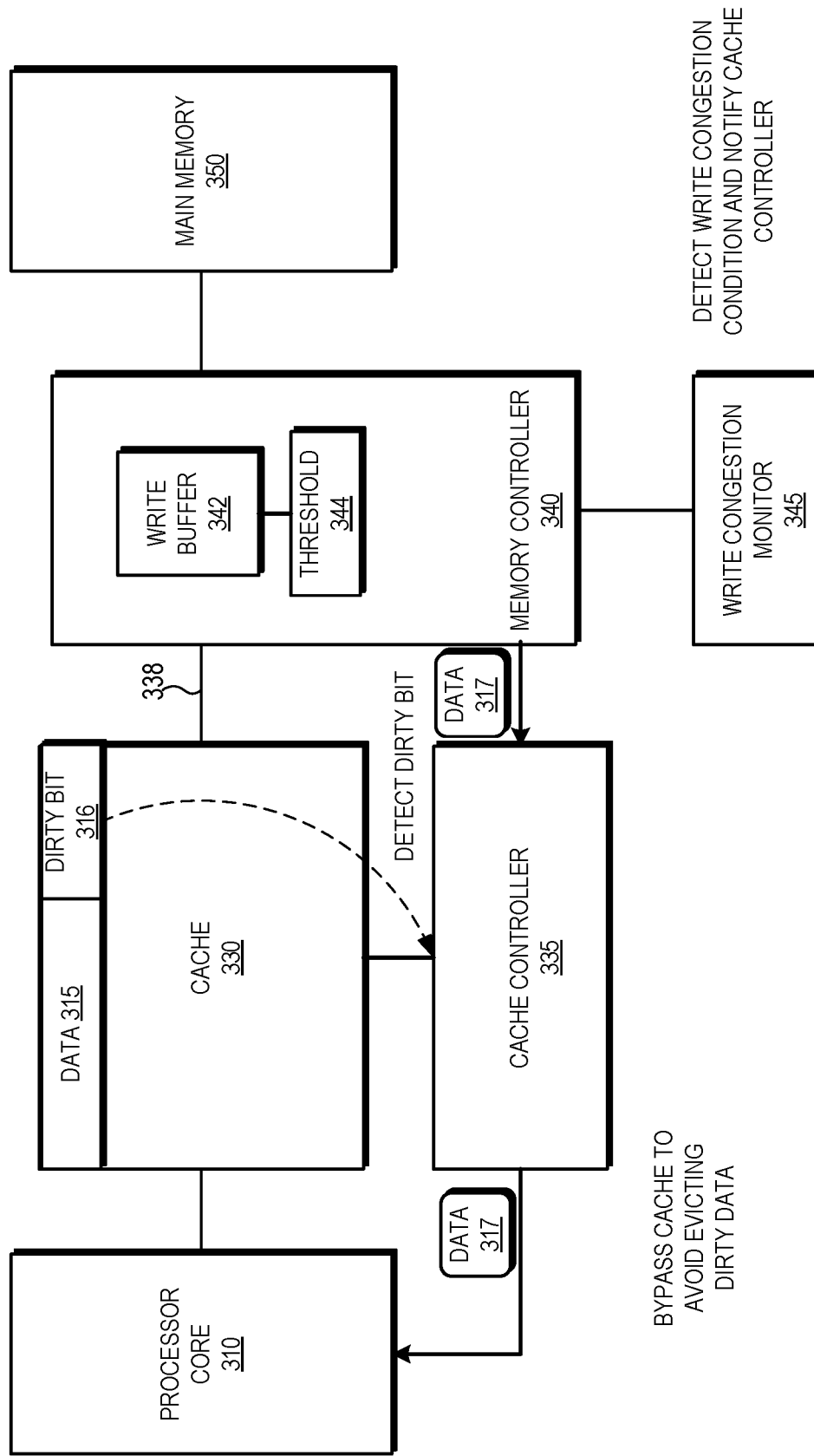
FIG. 3 is a block diagram of an example of the cache controller of FIG. 1 bypassing the cache when filling a memory access request in response to the write congestion monitor detecting a write congestion condition and the cache controller detecting a dirty cache line in accordance with some embodiments.

FIG. 3 illustrates an example of a cache controller 335 bypassing the cache 330 when filling a memory access request in response to the write congestion monitor 345 detecting a write congestion condition and the cache controller 335 detecting a dirty cache line in accordance with some embodiments. The processor core 310 issues a memory access request for data 317 to the cache controller 335. The data 317 is not found in the cache 330, resulting in a cache miss for the data 317. The cache controller 335 determines that storing the data 317 at the cache 330 will result in the eviction of data 315 from the cache 330. The cache controller 335 further detects the presence of a dirty bit 316 associated with data 315, indicating that data 315 is in a modified state. In response to determining that storing the data 317 at the cache 330 would result in the eviction of the dirty cache line 315, the cache controller 335 queries the write congestion monitor 345 to determine whether a write congestion condition exists.

The write congestion monitor 345 determines whether a write condition exists, such as the bus 338 being occupied, the write buffer 342 reaching a threshold 344 capacity, or a memory bank in main memory 350 for the dirty cache line 315 servicing requests. In some embodiments, the cache controller 335 may determine or be notified that the requested data 317 is not predicted to be subsequently requested within a threshold period of time. If the write congestion monitor 345 detects a write congestion condition, the write congestion monitor 345 asserts a signal to the cache controller 335 notifying the cache controller 335 of the write congestion condition. If the cache controller 335 determines that storing the data 317 at the cache 330 will result in the eviction of the dirty cache line 315 from the cache 330 and receives a signal from the write congestion monitor 345 that a write congestion condition exists, the cache controller 335 fills the memory access request by receiving the requested data 317 from the memory controller 340 and transferring it directly to the processor core 310. In this manner, the cache controller 335 bypasses the cache 330 when filling the memory access request and avoids or delays evicting the dirty cache line 315 from the cache 330.

Figure 4:
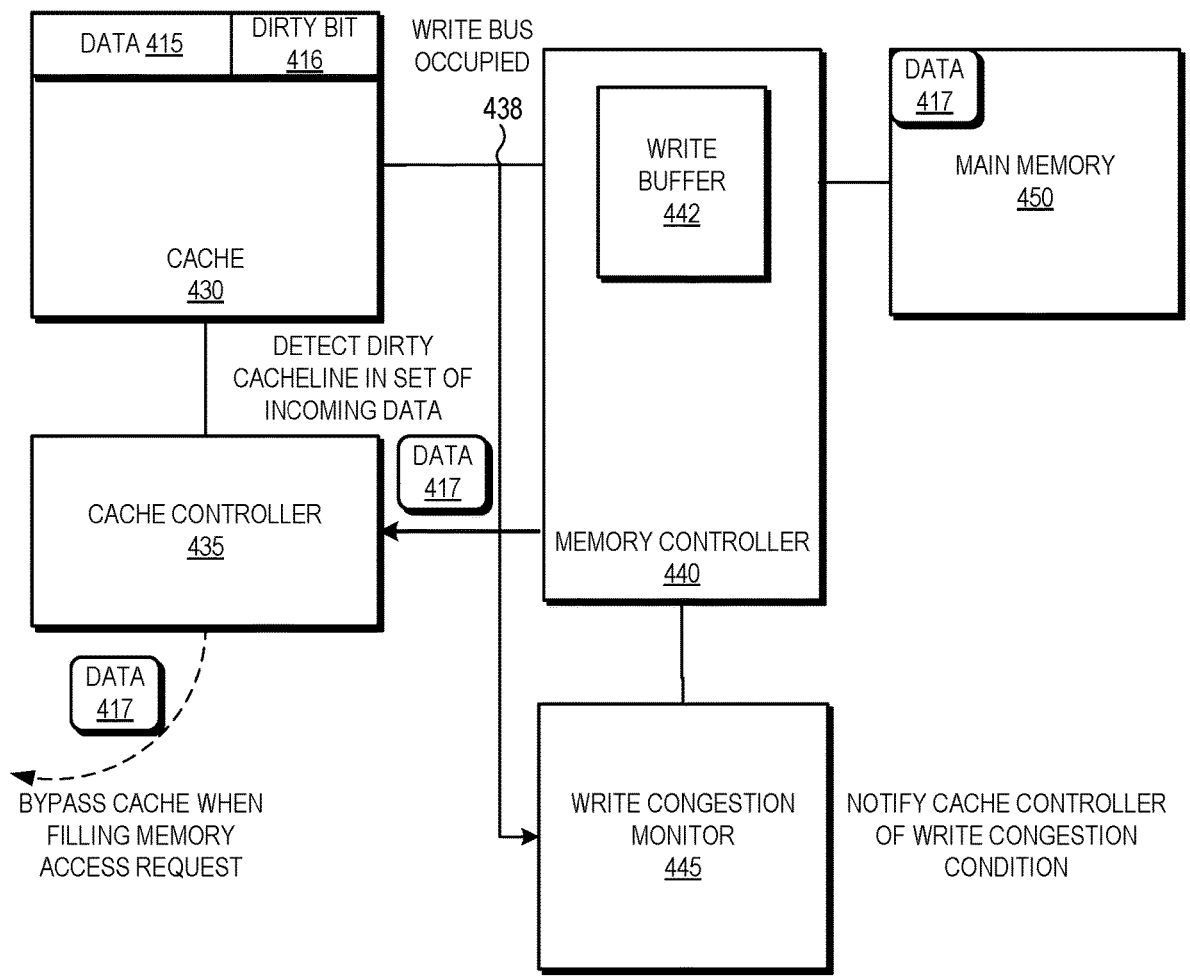
FIG. 4 is a block diagram of an example of the write congestion monitor of FIG. 1 detecting a write congestion condition in response to a write bus connecting the cache to the write buffer being occupied in accordance with some embodiments.

FIG. 4 illustrates an example of a write congestion monitor 445 detecting a write congestion condition in response to the write bus 438 connecting the cache 430 to the write buffer 442 being occupied in accordance with some embodiments. The memory controller 435 determines that filling a memory access request from the main memory 450 for data 417 will result in the eviction of data 415 from the cache 430. The cache controller 435 further detects the presence of a dirty bit 416 associated with the data 415, indicating that the data 415 is in a modified state. The cache controller 435 queries the write congestion monitor 445 to determine whether a write congestion condition exists. The write congestion monitor 445 detects that the write bus 438 is occupied with a write operation. In response to detecting that the write bus 438 is occupied with a write operation, the write congestion monitor 445 asserts a signal notifying the cache controller 435 that a write congestion condition exists. In response to determining that storing the data 417 at the cache 430 will result in the eviction of the dirty cache line 415 and that a write congestion condition exists, the cache controller 435 bypasses the cache 430 when filling the memory access request for data 417, and transfers the data 417 directly to the processor core (not shown), or to a lower level of cache (not shown).

Figure 5:
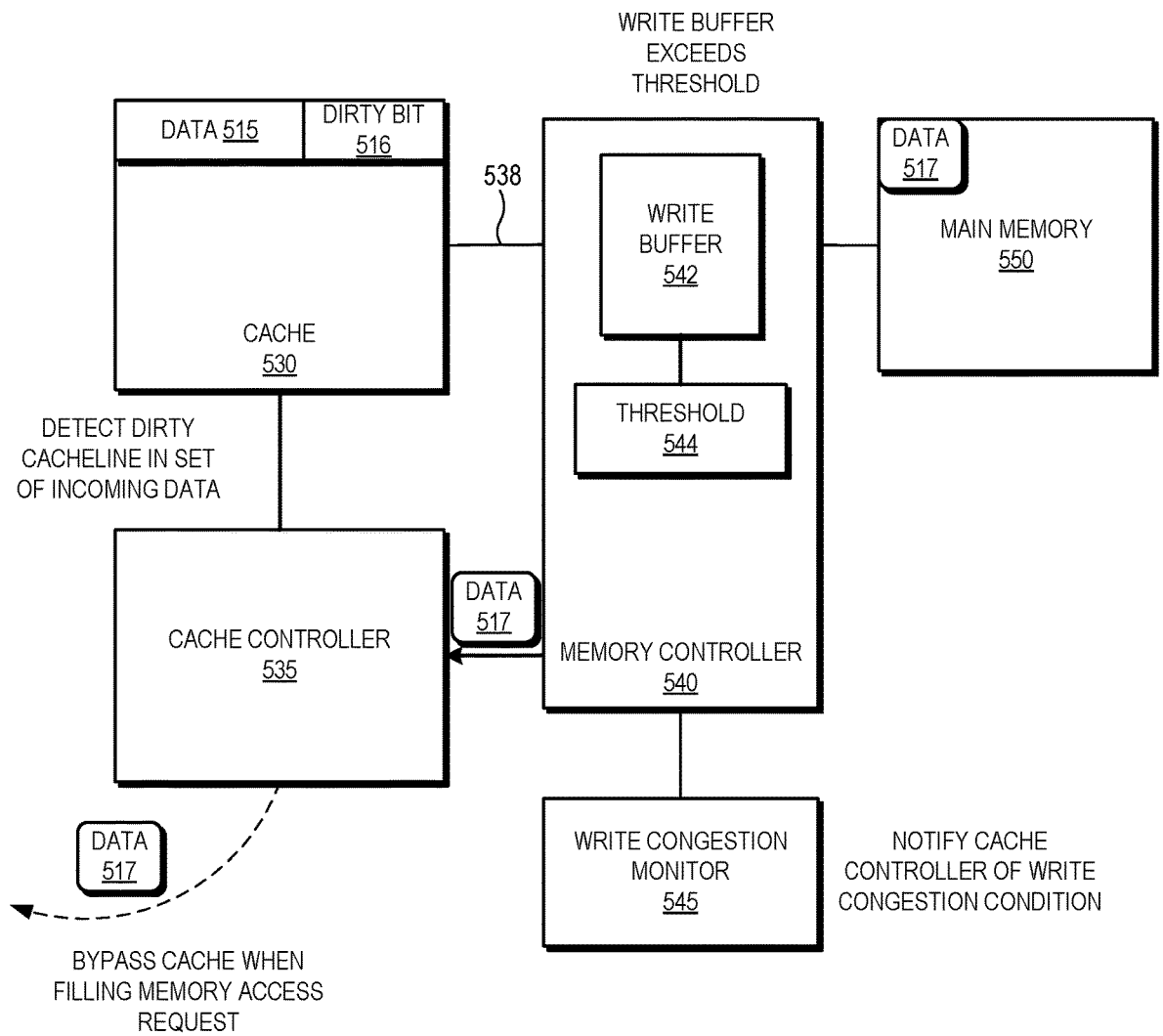
FIG. 5 is a block diagram of an example of the write congestion monitor of FIG. 1 detecting a write congestion condition in response to the write buffer reaching a threshold capacity in accordance with some embodiments.

FIG. 5 illustrates an example of a write congestion monitor 545 detecting a write congestion condition in response to the write buffer 542 reaching a threshold capacity in accordance with some embodiments. The cache controller 535 determines that filling a memory access request from the main memory 550 for data 517 will result in the eviction of data 515 from the cache 530. The cache controller 535 further detects the presence of a dirty bit 516 associated with the data 515, indicating that the data 515 is in a modified state. The cache controller 535 queries the write congestion monitor 545 to determine whether a write congestion condition exists. The write congestion monitor 545 detects that the write buffer 542 has reached a threshold occupancy 544. In response to detecting that the write buffer 542 has reached the threshold occupancy 544, the write congestion monitor 545 asserts a signal notifying the cache controller 535 that a write congestion condition exists. In response to determining that storing the data 517 at the cache 530 will result in the eviction of the dirty cache line 515 and that a write congestion condition exists, the cache controller 535 bypasses the cache 530 when filling the memory access request for data 517, and transfers the data 517 directly to the processor core (not shown), or to a lower level of cache (not shown).

Figure 6:
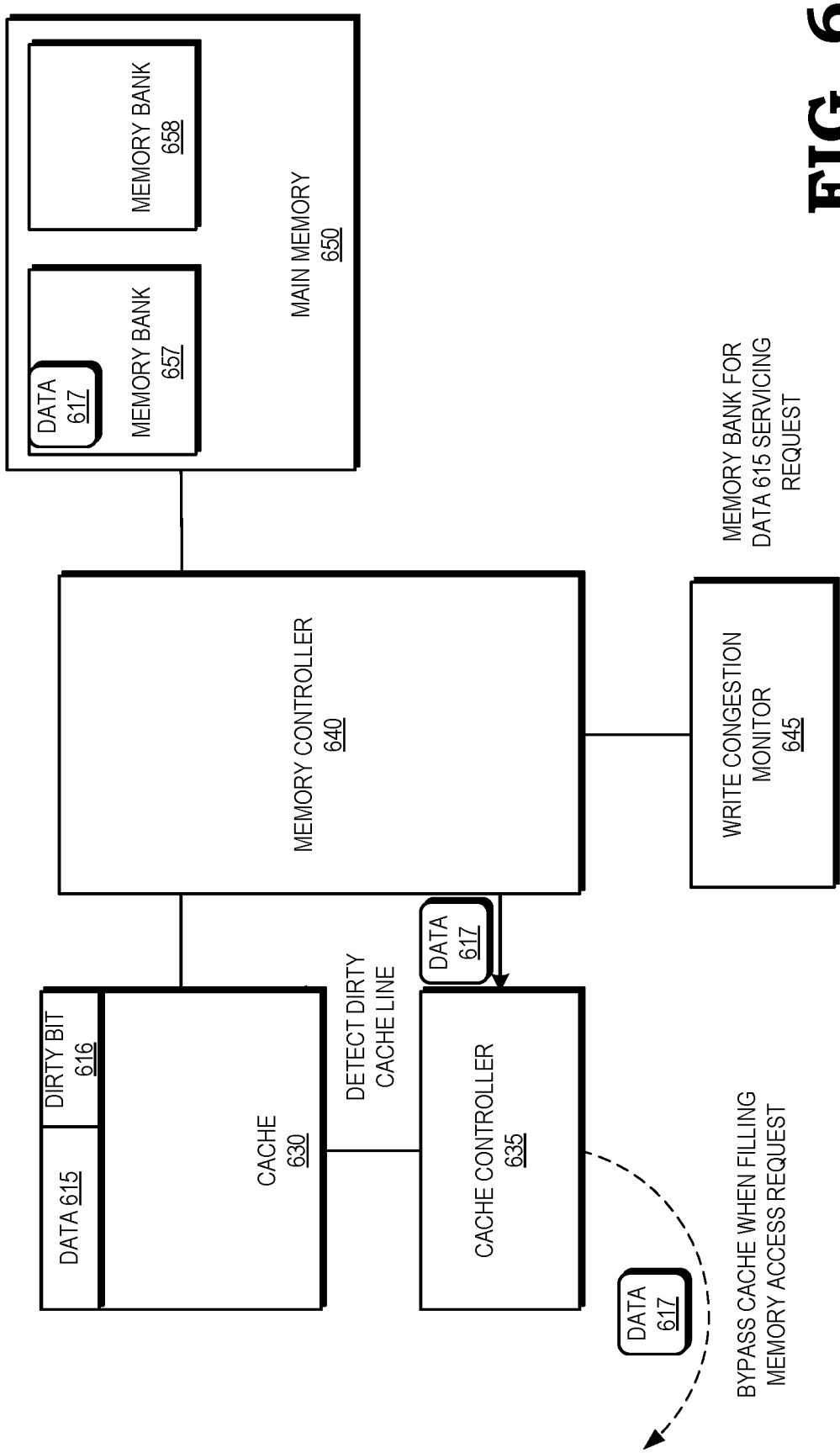
FIG. 6 is a block diagram of an example of the write congestion monitor of FIG. 1 detecting a write congestion condition in response to a memory bank for a dirty cache line being occupied with servicing requests in accordance with some embodiments.

FIG. 6 illustrates an example of a write congestion monitor 645 detecting a write congestion condition in response to a memory bank 657 of main memory 650 to which dirty cache line 615 would be allocated servicing requests in accordance with some embodiments. The cache controller 635 determines that filling a memory access request from the main memory 650 for data 617 will result in the eviction of data 615 from the cache 630. The cache controller 635 further detects the presence of a dirty bit 616 associated with the data 615, indicating that the data 615 is in a modified state. The cache controller 635 queries the write congestion monitor 645 to determine whether a write congestion condition exists.

The main memory 650 is divided into multiple memory banks (two memory banks 657 and 658 are shown) to which memory addresses are allocated. Contiguous memory addresses could be allocated to different memory banks, such that contiguous load operations (which are common both in multimedia and execution of programs) and contiguous store operations (which are used frequently when filling storage or communication buffers) use each memory bank in turn, instead of using the same memory bank repeatedly. By alternating memory banks for contiguous memory accesses, each memory bank has more time to perform a pending load or store operation before the next memory access request for an address allocated to that bank. This results in higher memory throughput, as each bank has a minimum waiting time between reads and writes. The write congestion monitor 645 detects that the memory bank 657 allocated for dirty cache line 615 is servicing requests. In some embodiments, the memory bank 657 is servicing requests when the number of outstanding requests to the memory bank is larger than a threshold. In response to detecting that the memory bank 657 in main memory 650 to which the dirty cache line 615 has been allocated is servicing requests, the write congestion monitor 645 asserts a signal notifying the memory controller 635 that a write congestion condition exists. In response to determining that storing the data 617 at the cache 630 will result in the eviction of the dirty cache line 615 and that a write congestion condition exists, the cache controller 635 bypasses the cache 630 when filling the memory access request for data 617, and transfers the data 617 directly to the processor core (not shown), or to a lower level of cache (not shown).

Figure 7:
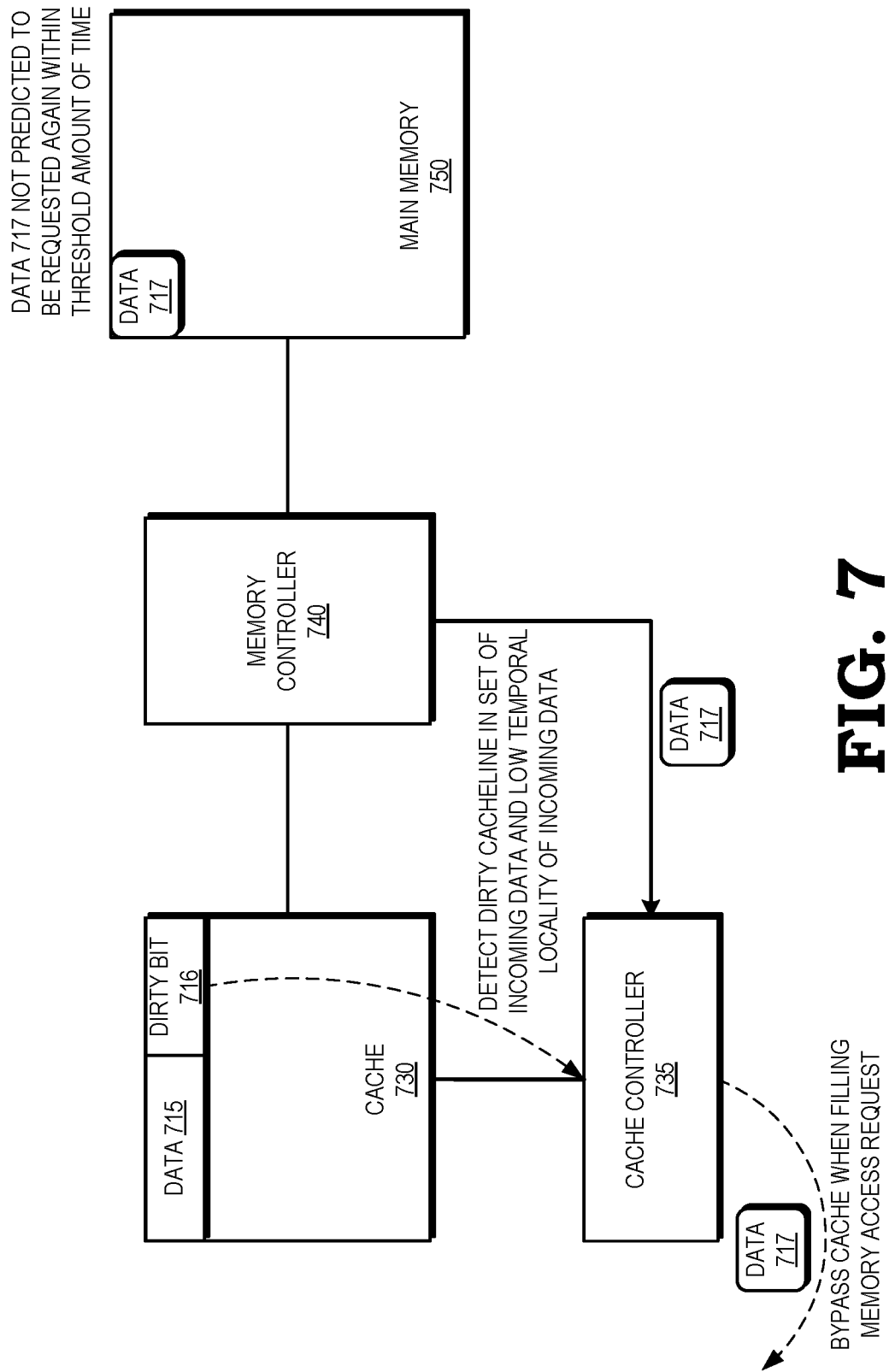
FIG. 7 is a block diagram of an example of the processing system of FIG. 1 bypassing a cache when filling a memory access request in response to the memory access request being for a cache line that is not predicted to be subsequently requested within a threshold period of time in accordance with some embodiments.

FIG. 7 illustrates an example of a cache controller 735 detecting or being notified that a memory access request is for data that is not predicted to be subsequently requested within a threshold period of time in accordance with some embodiments. The cache controller 735 determines that filling a memory access request from the main memory 750 for data 717 will result in the eviction of data 715 from the cache 730. The cache controller 735 further detects the presence of a dirty bit 716 associated with the data 715, indicating that the data 715 is in a modified state.

In some embodiments, the processor core (not shown) informs the cache controller 735 that the requested data 717 is unlikely to be subsequently requested by the processor core within a threshold amount of time 757 (i.e., the data has low temporal locality). In some embodiments, the cache 730 is connected to a prefetcher (not shown). The prefetcher is configured to prefetch cache lines into the cache 730. The prefetcher identifies patterns (e.g., requests for a sequence of addresses) that can be used to predict the addresses of subsequent requests. The prefetcher may predict that the requested data 717 has low temporal locality. For example, if the requested data 717 is included in streaming video, the data 717 may not be predicted to be requested subsequently within a threshold amount of time. In response to predicting or receiving notification that the requested data 717 is unlikely to be subsequently requested by the processor within a threshold amount of time and determining that storing the data 717 at the cache 730 will result in the eviction of the dirty cache line 715, the cache controller 735 bypasses the cache 730 when filling the memory access request for data 717, and transfers the data 717 directly to the processor core (not shown), or to a lower level of cache (not shown).

Figure 8:
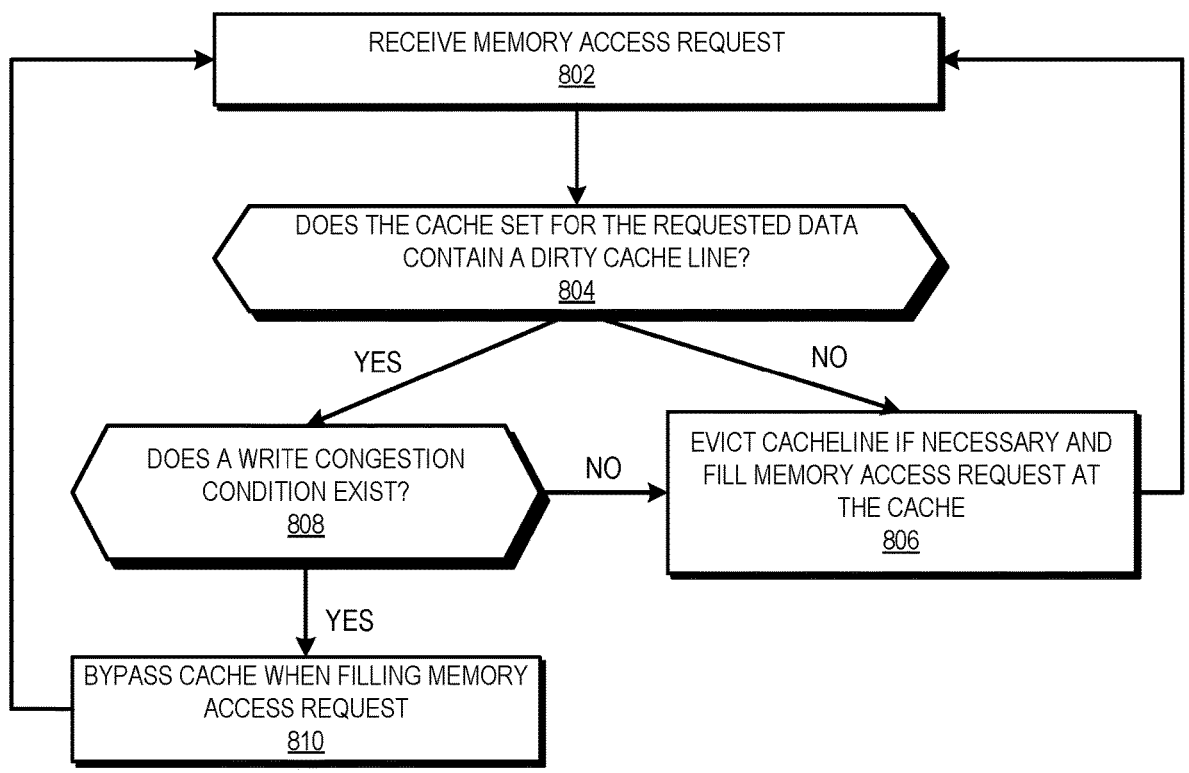
FIG. 8 is a flow diagram illustrating a method for filling a memory access request by bypassing a cache when the cache stores a dirty cache line and a write congestion condition has been detected in accordance with some embodiments.

FIG. 8 is a flow diagram illustrating a method for filling a memory access request from the processor core 110 of FIG. 1 for data that would result in the eviction of a dirty cache line from a cache by bypassing the cache when a write congestion condition has been detected in accordance with some embodiments. At block 802, the cache controller 135 receives a memory access request from the processor core 110. At block 804, the cache controller 135 determines whether storing the requested data at the cache 130 would result in the eviction of a dirty cache line from the cache 130. If storing the requested data at the cache 130 would not result in the eviction of a dirty cache line from the cache 130, at block 806, the cache controller 135 evicts a cache line from the cache 130 if necessary, and fills the memory access request by receiving the requested data from the memory controller 140, copying and storing it to the cache 130, and copying it to the processor core 110.

If storing the requested data at the cache 130 would result in the eviction of a dirty cache line from the cache 130, at block 808 the cache controller queries the write congestion monitor 145 to determine whether a write congestion condition exists. If the write congestion monitor 145 does not assert a signal indicating that a write congestion condition exists, the method flow continues to block 806, where the cache controller 135 evicts a cache line from the cache 130 if necessary, and fills the memory access request by having the memory controller 140 copy the requested data from the main memory 150, storing it to the cache 130, and copying it to the processor core 110. If the write congestion monitor 145 asserts a signal to the cache controller 135 that a write congestion condition exists, at block 810 the cache controller 135 bypasses the cache 130 when filling the memory access request.

In some embodiments, certain aspects of the techniques described above may be implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method implemented at a processor comprising a first cache, the first cache including a first cache line, the method comprising:
in response to detecting a write congestion condition and in response to the first cache line being in a modified state, and further in response to determining that filling a memory access request by storing requested data associated with the memory access request at the first cache would result in eviction of the first cache line,
bypassing the first cache when filling the memory access request for a read operation from the processor.

2. The method of claim 1, wherein the write congestion condition comprises a write bus connecting the first cache to a memory module being occupied.

3. The method of claim 1, wherein the write congestion condition comprises a write buffer having reached a threshold capacity.

4. The method of claim 1, wherein the write congestion condition comprises a memory bank to which the first cache line is allocated servicing memory access requests.

5. The method of claim 1, wherein the write congestion condition comprises the memory access request being for a second cache line that is not predicted to be subsequently requested within a threshold period of time.

6. The method of claim 1, wherein bypassing the first cache comprises transferring a cache line that is the subject of the memory access request directly from a main memory to a second cache that is closer to the processor than the first cache, and wherein the first cache is non-inclusive of the second cache.

7. The method of claim 1, wherein bypassing the first cache comprises transferring a cache line that is the subject of the memory access request directly from a main memory to the processor.

8. A method implemented at a processor associated with a memory and comprising a first cache including a first cache line, the method comprising:
in response to the processor generating a memory access request, detecting a write congestion condition indicating low write bandwidth to the memory and the first cache line being in a modified state; and in response to detecting the write congestion condition, and further in response to determining that filling a memory access request by storing requested data associated with the memory access request at the first cache would result in eviction of a dirty cache line from the first cache, bypassing the first cache when filling a memory access request from a processor.

9. The method of claim 8, wherein the write congestion condition comprises a memory write bus connecting the first cache to a memory module being occupied.

10. The method of claim 8, wherein the write congestion condition comprises a write buffer having reached a threshold capacity.

11. The method of claim 8, wherein the write congestion condition comprises a memory bank to which the dirty cache line is allocated servicing memory access requests.

12. The method of claim 8, wherein the write congestion condition comprises the memory access request being for a second cache line that is not predicted to be subsequently requested within a threshold period of time.

13. The method of claim 8, wherein bypassing the first cache comprises transferring a cache line that is the subject of the memory access request directly from a main memory to a second cache that is closer to the processor than the first cache, and wherein the first cache is non-inclusive of the second cache.

14. The method of claim 8, wherein bypassing the first cache is transferring a cache line that is the subject of the memory access request directly from a main memory to the processor.

15. A processing system, comprising:
a main memory;
one or more caches, wherein at least one of the caches stores a first cache line that is in a modified state in a first set;
a processor; and
a cache controller, wherein the cache controller is configured to bypass the at least one of the caches when filling a memory access request from the processor for a second cache line that is assigned to the first set in response to detecting a write congestion condition and further in response to determining that filling the memory access request by storing requested data associated with the memory access request at the at least one of the caches would result in eviction of the first cache line.

16. The processing system of claim 15, further comprising a write bus connecting the at least one of the caches to the main memory, wherein the write congestion condition comprises the write bus being occupied.

17. The processing system of claim 15, further comprising a write buffer, wherein the write congestion condition comprises the write buffer having reached a threshold capacity.

18. The processing system of claim 15, wherein bypassing the at least one of the caches comprises transferring a cache line that is the subject of the memory access request directly from the main memory to a second cache that is closer to the processor than the at least one of the caches, and wherein the at least one of the caches is non-inclusive of the second cache.

19. The processing system of claim 15, wherein bypassing the at least one of the caches comprises transferring a cache line that is the subject of the memory access request directly from the main memory to the processor.

* * * * *

UNITED STATES PATENT AND TRADEMARK OFFICE
CERTIFICATE OF CORRECTION

| | |
|---|---|
| PATENT NO. | : 10,599,578 B2 |
| APPLICATION NO. | : 15/377537 |
| DATED | : March 24, 2020 |
| INVENTOR(S) | : Amin Farmahini Farahani and David A. Roberts |

It is certified that error appears in the above-identified patent and that said Letters Patent is hereby corrected as shown below:

In the Claims

At Column 13, Claim 8, Line 6, please delete "cache when filling a" and substitute --cache when filling the--

Signed and Sealed this
Eighteenth Day of July, 2023

Katherine Kelly Vidal
*Director of the United States Patent and Trademark Office*